Patented Feb. 11, 1930

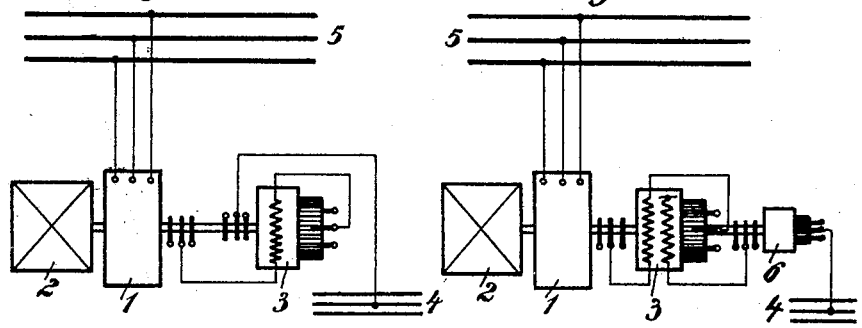
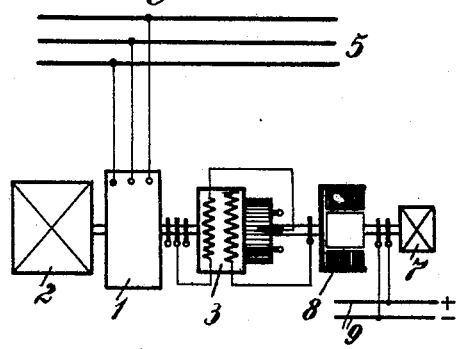
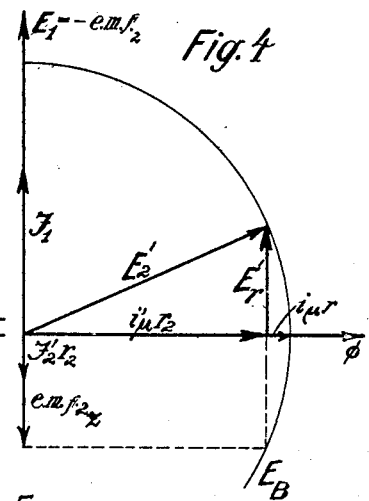
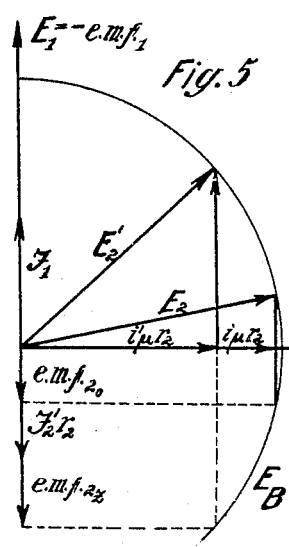
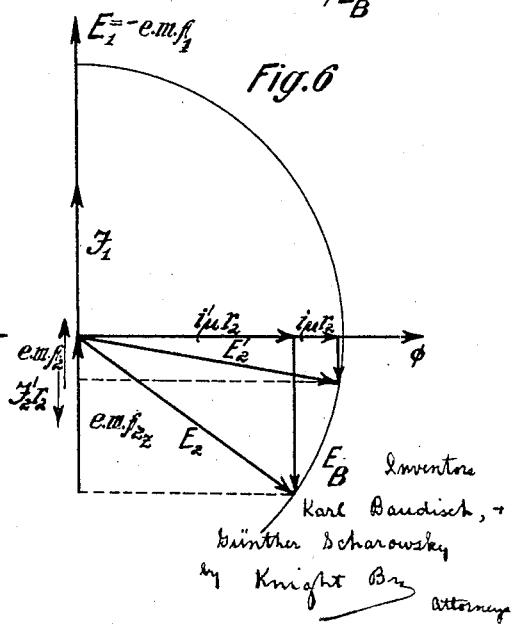

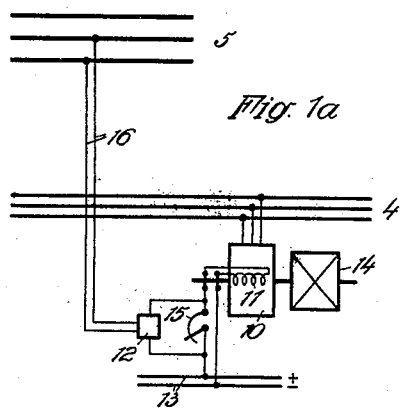
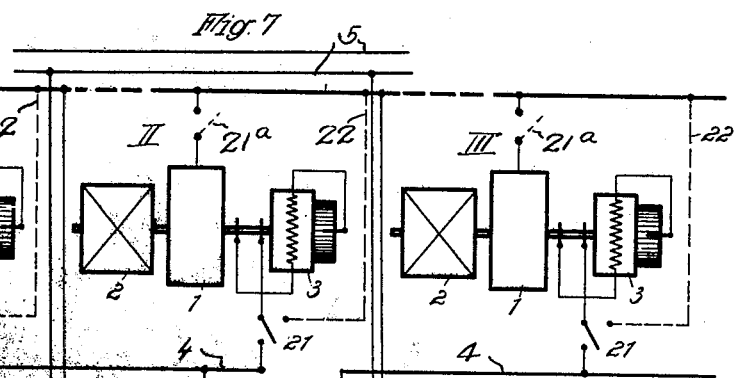
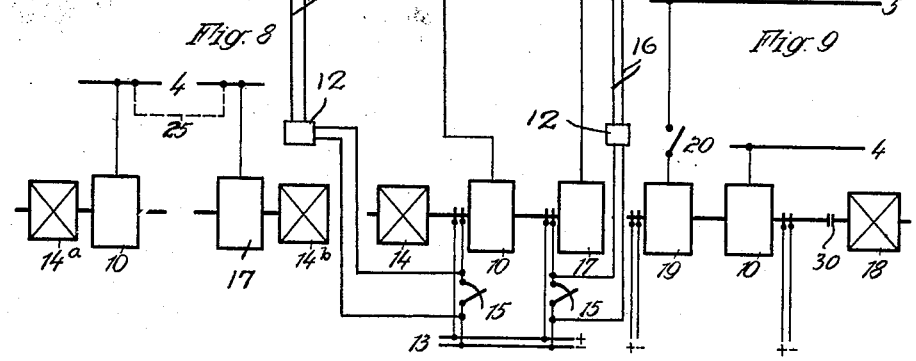

1,746,333

UNITED STATES PATENT OFFICE

KARL BAUDISCH, OF BERLIN-WILMERSDORF, AND GÜNTHER SCHAROWSKY, OF BERLIN, GERMANY, ASSIGNORS TO SIEMENS-SCHUCKERTWERKE GESELLSCHAFT MIT BESCHRÄNKTER HAFTUNG, OF SIEMENSSTADT, NEAR BERLIN, GERMANY, A CORPORATION OF GERMANY

MEANS FOR FEEDING ALTERNATING-CURRENT NETWORKS BY ASYNCHRONOUS GENERATORS

Application filed September 9, 1925, Serial No. 55,376, and in Germany September 13, 1924.

This invention relates to a method of feeding alternating current networks by means of asynchronous generators.

It is well known that asynchronous motors when operated hypersynchronously supply electric energy into the network and may thus be employed as generators to take part in the feeding of the network.

On the other hand, it has hitherto been impossible to feed a network merely by asynchronous generators.

This problem is solved by the present invention. According to the invention the feeding asynchronous generator is excited from a source of alternating current the voltage and frequency of which is independent from the network to be fed. The exciting energy is supplied to the generator through a device which is capable of converting the frequency of the exciting source of current. The cause which hitherto rendered impossible the exclusive feeding of a network by asynchronous generators resides in the fact that the alternating current which is generated has itself to serve for exciting the machine generating it. This leads to unstable conditions and at every attempt to work with asynchronous generators only, fluctuations of the voltage and frequency of such intensity develop with the load that any practical service is rendered impossible. In employing according to my present invention a source of alternating current for the excitation, the voltage and frequency of which are independent from the network to be fed, these difficulties are eliminated and an energy supply of the net work results which is far superior to the known energy generation by means of synchronous generators, because according to the invention the energy generation may be so developed that even at a fluctuating driving speed the voltage and frequency of the alternating current generated remains sufficiently constant.

Several embodiments of the invention are diagrammatically illustrated in the drawings in which:

Fig. 1 represents an asynchronous generator unit excited by a commutator machine which is controlled in turn from a constant frequency source;

Fig. 1ª shows how the constant frequency line 4 in Fig. 1 may be supplied with current;

Figs. 2 and 3 represent a similar general arrangement, as shown in Fig. 1 in which, however, the stator of the commutator machine is separately excited;

Figs. 4 to 6 represent vector diagrams;

Fig. 7 shows how a plurality of asynchronous generators may be operated in parallel;

Fig. 8 shows how several independent constant frequency sources may be jointly controlled and Fig. 9 shows how an independent constant frequency source may be changed into a dependent one.

Referring to the embodiment illustrated in Fig. 1, the asynchronous machine 1, whose primary winding, in this case the stator winding, is connected to line system 5 which it should automatically feed. The machine itself is driven by a prime mover 2. The secondary winding, in this case the rotor winding of the generator 1 is connected with the brushes of a commutator machine 3 which is mechanically coupled with the generator. This commutator machine 3 has the task of converting the frequency and is furthermore through slip rings connected with a source of alternating current 4 of an independent kind, generated by a small synchronous generator not shown here. For simplicity sake only one brush connection is shown between generator 1 and machine 3 and between the latter and source 4.

Such a machine set has the peculiarity that the frequency at the network terminals of the asynchronous machine 1, independently of the speed and the load, is always identical with the frequency at the slip rings of the commutator machine 3. From this follows that the frequency produced by the generator is dependent upon the exciter frequency only and that speed fluctutations of the generator have no influence upon the frequency of the network. Here the simplest and for the service quite valuable case exists that the exciter frequency is equal to the frequency of the net work. The excitation of the commutator machine here takes place with constant network frequency.

According to the invention also a commutator machine may be employed having its stator separately excited. The excitation of this machine must then take place at variable frequency so that, at the generator speed developed for the time being, the network frequency shall remain constant. This variable frequency may be obtained at the momentary value necessary for the time being, for instance by the aid of a driving machine of constant speed, which operates devices for converting the frequency known in themselves, for instance, frequency converters, differential gears or their electric or mechanical electric equivalents.

Two such embodiments of the invention are illustrated in Figs. 2 and 3 of the drawings.

Referring to Fig. 2, 1 is again the asynchronous generator, 2 the driving prime mover, 3 the commutator machine which in this case is stator excited, 4 a network carrying constant frequency current which is generated by a prime mover of constant speed not shown here. 5 is the network to be fed and 6 a frequency converter mechanically coupled with the generator. By the frequency of net converter 6 the constant exciter frequency 4, corresponding with the constant speed, is converted into the slip frequency required for the generator speed existing at the time and for the desired network frequency. The commutator machine 3 is thus in this case excited with variable frequency.

A similar embodiment of the invention is illustrated in Fig. 3. Here 1 is again the generator, 2 its driving prime mover, 3 the stator excited commutator machine, 5 the network to be fed, 8 a so-called electric differential drive which is coupled with the machine set through the stator, but whose rotor is driven by a special prime mover 7. The machine 8 is constructed like an ordinary synchronous generator, so that, for instance, three-phase current may be withdrawn from the stator when the rotor is supplied with direct current excitation from a direct current network 9. For simplicity sake only one slip ring is shown for the stator machine 8, together with its lead to machine 3. Here again the commutator machine 3 receives its excitation at variable frequency which in spite of the constant driving speed of the machine 7 has always the correct value for the time being owing to the peculiarity of the differential drive.

The hitherto described systems may be still further improved. In arrangements such as is for instance shown in Fig. 1, the source of current supplying the exciter current 4 would be called upon to take part in the feeding of the network 5 with energy through the generator set and would therefore require a considerable mechanical driving energy.

According to the invention the commutator machine must therefore be so constructed that a transmission of power from the primary to the secondary part by induction is rendered impossible. The commutator machine is therefore designed as so-called compensated machine in which, for instance, stator and rotor windings are so connected in series that their ampere turns neutralize each other. Electrical energy supplied to the machine through the stator can therefore only convert itself into mechanical energy at the shaft and vice versa, while at the slip rings exciter current only exists. Since these exciter currents have only to cover the magnetization and a part of the ohmic losses of the commutator machine, the size of the exciter machine which supplies net 4 may be extremely small in comparison with the main generator.

If a machine set, for instance, that illustrated in Fig. 1, is excited from the source of current 4 and if the generator runs at a synchronous speed exactly corresponding with exciting frequency 4, the voltage $E_B$ impressed by the brushes of the machine 3 has to cover merely the ohmic voltage drops caused in the rotor by the magnetizing current, because owing to the synchronous operation no electromotive forces whatever are generated in the rotor winding of the main machine. In Figure 4 this ohmic voltage drop is represented by the vector $i_\mu r$; in phase with $i_\mu r$ is the field $\phi$. At right angles to this field is the primary terminal voltage $E_1$. For the impressed voltage $E_B$ a circle has been drawn which corresponds with the amplitude of this voltage. This circle is the geometric locus of the end point of this vector, because the phase position of $E_B$ relatively to the terminal voltage $E_1$ is not fixed and depends upon the voltage drops and E. M. F.'s in the secondary circuit of the main machine which have to be overcome. If now this generator, first running light, is loaded from the network 5 with an effective current $J_1$, a retarding moment is generated at the shaft of the generator which must be overcome by the driving prime mover. The speed of the prime mover will drop in correspondence with the characteristic of its regulator and thus bring the generator to hyposynchronous speed. In the secondary circuit an E. M. $F_{.2_z}$ is thus generated and a further ohmic voltage drop of the alternating current $J'_2 r_2$ occurs in the secondary circuit. These and the additional E. M. $F_{.2_z}$ are in phase with one another; they must be balanced by the impressed voltage $E_B$, this means, that the brush voltage $E_B$ must develop a component $E_r'$ which is equal and opposite to the sum of the two first voltages. The diagram shows that the vector $E_B$ in the position $E'_2$ satisfies this requirement. For covering the ohmic voltage drop caused by the magnetizing current there only remains the vector $i'_\mu r_2$ which is considerably smaller than the vector $i_\mu r$ available when running light, that means the exciting current drops at the ratio of the two vectors. The field and thus the primary voltage $E'_1$ thus decreases with increasing load. Fig. 5 shows the behaviour of the generator in the case when the no-load speed of the prime mover is below the synchronous speed corresponding with the exciting frequency 4 and that thus the generator operates within the hyposynchronous range from the beginning. In this condition of service the impressed commutator machine voltage $E_B$ must cover at no-load the voltage drop $i_\mu r_2$ caused by the magnetizing current and the secondary E. M. F.$_{2_0}$ caused by the slip. It satisfies this condition in the vector position $E_2$. If the generator is loaded an ohmic voltage drop of the watt current $J'_2 r_2$ is produced and an additional E. M. F.$_{2_z}$ caused by the drop of the speed of the prime mover. The impressed voltage $E_B$ must now balance the three vectors E. M. F., $J'_2 r_2$ and E. M. F.$_2$ and it satisfies these conditions in the position $E'_2$. The component $i'_\mu r_2$ then available for the ohmic voltage drop of the exciting current is again considerably smaller than the original one $i_\mu r_2$ and causes a great drop of the voltage with the load.

The conditions are essentially different if the no-load speed of the prime mover is chosen above the synchronous speed corresponding with the exciting frequency 4. Figure 6 shows the diagram for this state of service. Owing to the hypersynchronous speed a voltage E. M. F.$_2$ is generated which at no-load must be balanced by the brush voltage $E_B$. It satisfies this condition in the position $E_2$. The component determining the exciting current is then $i_\mu r_2$. Under load, i. e. when the speed of the prime mover drops, a reduction of the secondary E. M. F. to the value E. M. F.$_2$ first takes place. The ohmic voltage drop $J'_2 r_2$ of the secondary watt current is opposed to this E. M. F. so that now only the difference of these two vectors must be balanced. The impressed voltage $E_B$ satisfies this condition in the position $E'_2$. For covering the ohmic voltage drop caused by the exciting current the vector $i_\mu r_2$ is now available and this vector is now greater than the vector at no-load $i_\mu r_2$, which means that the magnetizing current is under load larger, the field stronger and the terminal voltage $E_1$ higher. This amounts thus to an automatic counter compounding of the voltage which can only be desirable in any case because the magnetization necessary for maintaining a definite network voltage grows with the load for the generator as well as for all load machines. By correctly adjusting the hypersynchronous no-load speed the increase of the magnetization under load may be kept within such limits, that the network voltage remains practically constant without any regulation whatever.

By the described arrangements asynchronous generator systems have thus been developed, the frequency of which is entirely and the voltage of which is almost independent from the load. While hitherto it was attempted to keep the speed of the prime mover as constant as possible by means of expensive and complicated governors or regulators, such apparatus is no longer necessary. From Fig. 6 of the drawings it follows that the voltage and the magnetization rises the more the greater the speed drop of the prime mover is at growing load.

The system may even be so developed that the terminal voltage increases with a growing load, i. e. that the voltage drops developed in the network and any existing extra demand in wattless output are automatically covered by the characteristic of the asynchronous generator.

In cases in which it is impossible to adapt the voltage characteristic accurately to the existing conditions. it is, of course, easily possible to control the source of excitation 4 by hand or automatically. If, for instance, the exciting current 4 is supplied by a small synchronous generator, the excitation of said synchronous generator may be automatically controlled by known means, such as automatic regulators, quick regulators and the like according to known systems of connection in dependence for the service conditions of the main network.

An arrangement of this character is shown in Fig. 1ª. In this figure 5 again indicates the alternating current mains which are supplied from the generator system, and 4 the line system through which the constant frequency alternating current is supplied as is shown in Fig. 1. 10 represents the synchronous generator which feeds the net work 4 and which may be driven by any suitable prime mover indicated at 14. The main prime mover 2, the asynchronous main generator 1 and the commutator machine 3, shown in Fig. 1, have been omitted in Fig. 1ª as superfluous for the purpose of that figure. The field winding 11 of the synchronous generator 10 is excited by direct current derived from an auxiliary net work 13. The exciter current may be controlled in two ways as may appear expedient at the moment. It may be controlled by hand, by means of a rheostat at 15, or automatically by an automatic regulation such as a so-called "Tirill" regulator 12 which is arranged in parallel to rheostat 15. Such an automatic regulation is well known in the art and, as is shown in Fig. 1ª, should function in dependency of the voltage prevailing in the mains 5 and, therefore, a corresponding connection with these mains is indicated at 16.

In the embodiment illustrated in Fig. 1 of the drawings the exciter frequency 4 should preferably be chosen equal to the desired network frequency, Since owing to the compensation of the commutator machine the source supplying the excitation current is not made use of to supply effective current, the frequency of this current may easily be kept constant. The problem of keeping the network frequency constant is thus solved in an extremely simple manner. If, for instance, for the generation of the exciting current a small synchronous generator is employed, it is possible to keep the speed of this generator and thereby the excitation frequency and thus the network frequency constant by well known means.

If a plurality of asynchronous generators feed into the same system operation in parallel and freedom from hunting is ensured if all generators are fed from the same source of excitation. This arrangement is shown in Fig. 7 which comprises as an example three power units I, II, III. Each unit feeds into the common utility lines 5, such as are shown in Fig. 1 at 5, so that all three units operate in parallel. Their individual commutator machines 3 are supplied from constant frequency supply lines 4, of which for simplicity sake only one line wire is shown.

For practical reasons it may be desirable to divide the supply line 4 into several separate exciter systems. Fig. 7 shows how this idea may be carried out in practice. Line 4 for example is divided there into two independent sections, supplied by two different generators 10 and 17 which are, however, mechanically coupled to a common prime mover unit 14. The excitation of generators 10 and 17 is accomplished in the same manner as shown in Fig. 1$^a$, for instance by means of rheostats 15 which control direct current from an auxiliary net 13, an automatic regulator 12 being provided as in Fig. 1$^a$, for each of the machines 10 and 17, arranged in parallel to rheostat 15, and functioning in dependency of the voltage prevailing in mains 5 as explained with respect to Fig. 1$^a$. Since for these generators the conditions of the synchronous vector operation are given from the beginning the paralleling offers no difficulties whatever.

If on the other hand generators operating in parallel have their commutator machines fed from different excitation current sources, provisions must be made that the excitation sources run synchronously. This may be brought about by the aid of known means, for instance by synchronizing lines for the excitation systems or by means of mechanical devices. By turning the excitation vectors the load may be distributed over the various asynchronous generators as desired. A similar effect may be attained by adjusting the regulator or governor of the prime mover or by controlling the excitation voltage.

Fig. 8 shows how we may supply the commutator machines from two independent excitation current sources as aforementioned, namely 14$^a$, 14$^b$ respectively. In this case, as stated, the two individual supply systems 4 are connected with each other by a synchronizing line 25 which may contain any one of the well known synchronizing means or expedients, so that the two small synchronous generator units 10 and 17 may be brought into synchronism for parallel operation in well known manner.

With each change of the distribution of the load by turning the exciter vector also the distribution of the wattless output generation changes. The characteristic of the wattless output generation depends in particular upon the adjustment of the generator set for hyper- and hyposynchronous no-load run.

If in one system a plurality of spaced asynchronous generator plants exists, it is generally only necessary that one of these generator plants feed the system as time beating or regulating machine with constant frequency. All the remaining generators may be asynchronous generators of a known kind which are not suitable for the independent feeding of the system or network. This eliminates the necessity, which would arise if a plurality of independently operating generators exists, of connecting the exciters of the individual generators with one another by synchronizing devices. In the event that the time beating generator plant drops out another generator plant must be brought into time beating operation in order that the dependent generators are able to continue their operation. It is, therefore, advisable to design those generator plants which, owing to their size or by reason of other service conditions come into consideration for beating time, in such a manner that they are capable of operating either independently or dependently. This is attained by driving in a hydraulic plant, for instance, the exciter contemplated for the independent service from a water turbine with constant speed, if the plant should serve for time beating or regulating. If the time beating is taken over by another plant, the exciter machine is driven by a synchronous motor which is connected up with the motor while the water turbine is uncoupled or runs idle. The generator is then excited at the frequency of the system through the synchronous converter and thus operates dependently. An arrangement of this character is shown in Fig. 9. In this figure 18 represents the prime mover, for instance a water turbine for driving the exciter generator 10 which supplies the net 4 with synchronous alternating current which in turn is supplied to the local commutator machine unit which coacts with the local asynchronous generator unit, these two latter machines being not shown in this figure but assumed to constitute the local power unit which supplies energy into the mains 5. Thus the local power unit whose synchronism is controlled from the synchronous supply line 4 acts for the other main generator units supplying into the mains 5 as a time-beating unit. If it should now be desired to have another asynchronous power unit which supplies into mains 5 take over the time-beating function, the prime mover 18 of the local station shown in Fig. 9 is uncoupled at 30 from the generator 10 and the latter is driven from a synchronous motor 19 with which it is always coupled but which now is electrically connected by the switch 20 to the mains 5 from which it derives operating current. By the alternative change of the time beating machine it is possible with this arrangement in the simplest manner to fulfill all occurring service requirements, for instance readiness for service, available quantity of energy and the like and to limit the provision of independently operating generator plants to a minimum.

Provisions of this sort are indicated in Fig. 7. As will be noted from this figure it is possible to connect the commutator machines of the individual units I, II, III at will, either with constant frequency supply lines 4 or through the auxiliary connections 22 with the mains 5, by means of change over switches 21. A unit, whose commutator machine 3 has thus been connected to the mains 5 and thus derives its excitation current from its own net work, thereby loses its dominating time-beating or frequency-controlling character and falls to the level of an ordinary dependent unit. The procedure for thus synchronizing a machine would be as follows: The switch 21ª connecting the machine 1 to the mains 5 is at first open, and the machine is brought to approximate synchronous speed by means of the prime mover 2. Thereupon switch 21 is connected to line 22, which latter, as aforementioned, is connected to the mains 5, so that in this manner the commutator machine 3 receives its excitation from the mains 5, and in turn the asynchronous machine is excited at the frequency prevailing in the mains 5. Thereupon switch 21ª is closed, by which the asynchronous machine is thrown upon the mains 5.

The invention includes machines of any number of phases.

It will be readily understood that various modifications may be made in the embodiment of my invention and we desire that only such limitations shall be placed thereon as are imposed by the prior art or as specifically set forth in the appended claims.

We claim as our invention:—

1. In an alternating current line supply system the combination of an asynchronous generator having a primary and a secondary winding, the primary winding being connected to the mains for supplying current thereto, an outside excited commutator machine mechanically coupled to said generator and having a compensating and an exciting winding and having its brushes connected with the secondary winding of said generator and a source of alternating current whose frequency is independent of said line supply system and which is connected to said exciting winding for exciting said commutator machine.

2. In an alternating current line supply system the combination of an asyncronous generator having a primary and a secondary winding, the primary winding being connected to the mains for supplying current thereto, a commutator machine mechanically coupled to said generator and having a compensating and an exciting winding and having its brushes connected with the secondary winding of said generator and a source of alternating current whose frequency is independent of said line supply system and which is connected to said exciting winding for exciting said commutator machine, and means for automatically regulating the voltage of said source in accordance with the electrical conditions prevailing in said line supply system.

3. In an alternating current line supply system the combination of an asynchronous generator having a primary and a secondary winding, the primary winding being connected to the mains for supplying current thereto, an outside excited commutator machine mechanically coupled to said generator and having a compensating and an exciting winding and having its brushes connected with the secondary winding of said generator and a source of alternating current whose frequency is independent of said line supply system and which is connected to said exciting winding for exciting said commutator machine, and means for regulating the generator unit, including said generator and said commutator machine, to a speed, hypersynchronous with respect to the frequency of said line supply system.

4. In an alternating current line supply system the combination of a plurality of asynchronous generators each having a primary and a secondary winding, the primary windings being connected to said supply system for supplying current thereto, a plurality of outside excited commutator machines, each having a compensation and an exciting winding and each having its commutator brushes respectively connected with the secondary winding of one of said generators, sources of alternating current whose frequency is independent of said line supply system and which are connected to the exciting windings of said commutator machines, and means for maintaining the voltage vectors of said sources at the desired phase relation relatively to each other.

5. In an alternating current line supply system the combination of a plurality of asynchronous generators each having a primary and a secondary winding, the primary windings being connected to said supply system for supplying current thereto, a plurality of outside excited commutator machines, each having a compensation and an exciting winding and each having its commutator brushes respectively connected with the secondary winding of one of said generators, sources of alternating current whose frequency is independent of said line supply system and which are connected to the exciting windings of said commutator machines, and means for selectively connecting the exciting windings of the individual commutator machines to the alternating current supply system or to the independent sources of alternating current.

6. In an alternating current line supply system the combination of a plurality of asynchronous generators each having a primary and a secondary winding, the primary windings being connected to said supply system for supplying current thereto, a plurality of outside excited commutator machines, each having a compensation and an exciting winding and each having its commutator brushes respectively connected with the secondary winding of one of said generators, sources of alternating current whose frequency is independent of said line supply system and which are connected to the exciting windings of said commutator machines, means for selectively connecting the exciting windings of the individual commutator machines to the alternating current supply system or to the independent sources of alternating current, and means for connecting each asynchronous generator to the supply system after it has been excited by its commutator machine at the desired frequency.

In testimony whereof we affix our signatures.

KARL BAUDISCH.
GÜNTHER SCHAROWSKY